United States Patent [19]
Baues et al.

[11] 4,120,560
[45] Oct. 17, 1978

[54] OPTICAL WAVEGUIDE NETWORK

[75] Inventors: Peter Baues, Krailling; Gerhard Winzer, Munich, both of Germany

[73] Assignee: Siemens Aktiengesellschaft, Berlin & Munich, Germany

[21] Appl. No.: 871,011

[22] Filed: Jan. 20, 1978

Related U.S. Application Data

[63] Continuation of Ser. No. 692,739, Jun. 4, 1976, abandoned.

[30] Foreign Application Priority Data

Jun. 9, 1975 [DE] Fed. Rep. of Germany ....... 2525678

[51] Int. Cl.² ............................ G02B 5/14; G02F 1/13
[52] U.S. Cl. .................................. 350/96.14; 350/347
[58] Field of Search ............................. 350/96.14, 347

[56] References Cited

U.S. PATENT DOCUMENTS

| | | | |
|---|---|---|---|
| 3,795,433 | 3/1974 | Channin | 350/96.14 |
| 3,883,220 | 5/1975 | Taylor | 350/96.14 |
| 3,909,108 | 9/1975 | Taylor | 350/96.14 |
| 3,980,395 | 9/1976 | Giallorenzi et al. | 350/347 |

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

The present invention relates to an optical waveguide network for crossing-free switching of a guided signal from any input to any output and consisting of n waveguides disposed optically parallel to one another and located on a substrate and of a plurality of pairs of electrodes. A waveguide network of this type is provided having two electrode pairs in each case disposed such that two adjacent waveguides are connected by two electrode pairs and either the substrate made of lead zirconate and lead titanate ceramic material or a liquid crystal layer is provided instead, disposed above or below the waveguide plane or another electro-optical switchable material. In a preferred embodiment, an additional dielectric intermediate layer is provided under and/or above the waveguide plane, together with perhaps another dielectric insulating layer disposed above the waveguide plane.

4 Claims, 6 Drawing Figures

OPTICAL WAVEGUIDE NETWORK

This is a continuation of application Ser. No. 692,739 filed June 4, 1976 now abandoned.

BACKGROUND OF THE INVENTION

The present invention relates to an optical waveguide network for crossing-free switching of a guided signal from any input to any output and consisting of $n$ waveguides disposed optically parallel to one another and located on a substrate and of a plurality of pairs of electrodes.

In addition to simple branching systems, optical communications techniques with guided light waves also require switchable branching networks. These networks can be built up on a basic substrate in the form of integrated optical circuits.

In an article by H. F. Taylor – "Design of Optical Circuits", which appeared in NELC TR 1913 AD 779847 Report, April 1974, a network is illustrated in which the light is transferred from waveguide to waveguide in a switching element along a defined transfer path. The transfer length over which a specific waveguide mode transfers completely from one waveguide to the other with a given waveguide separation and a given waveguide breadth depends upon the refractive indices of the switch components. With this known switching arrangement, the refractive indices of an electro-optical material are controlled by special electrode structures through which waveguides are induced while the wave guidance only takes place here in one layer plane.

Consequently, to build a network with $n$ inputs and $n$ outputs $n(n-1)/2$ switching elements are needed in order to minimize the problems of cross-talk.

SUMMARY OF THE INVENTION

It is an object of the present invention to provide an optical waveguide network which is free of intersecting waveguides and in which a substantial reduction in the number of switching elements needed is achieved.

Starting with a waveguide network of the type referred to above, two electrode pairs are provided in each case disposed in such a way that in each case two adjacent waveguides are connected by two electrode pairs and either the substrate is made of lead zirconate and lead titanate ceramic material or a liquid crystal layer is provided instead disposed above or below the waveguide plane or another electro-optical switchable material.

In a preferred embodiment example, an additional dielectric intermediate layer is provided under and/or above the waveguide plane, together with perhaps another dielectric insulating dividing layer disposed above the waveguide plane.

With the optical waveguide network in accordance with the invention, it is possible to switch the signal guided in any one optical waveguide of a multiple of $n$ supplying waveguides to any one output of a multiple of $n$ collecting waveguides, for which two waveguide layer planes are used which are free of intersecting waveguides and consequently only require $2(n-1)$ switching elements. With $n = 20$, this means that the waveguide network in accordance with the invention has 38 switching elements whereas the known arrangement needs 190 switching elements.

A further essential advantage of the network in accordance with the invention lies in the structure tolerances inside the waveguide planes being less critical and in the waveguides being applicable in the form of low-attenuation strip guides and in the relatively high losses of the electro-optical material only having to be tolerated in the short sections of the switching elements. In this way, the disadvantages of the known arrangements inherent in the fact that variations in the width of the extremely narrow dividing zones between any two waveguides have a great effect upon the switching characteristics are avoided.

BRIEF DESCRIPTION OF THE DRAWINGS

In the following, the invention is described with reference to the drawings, by way of example.

DESCRIPTION OF THE PREFERRED EMBODIMENTS

Figure 1:
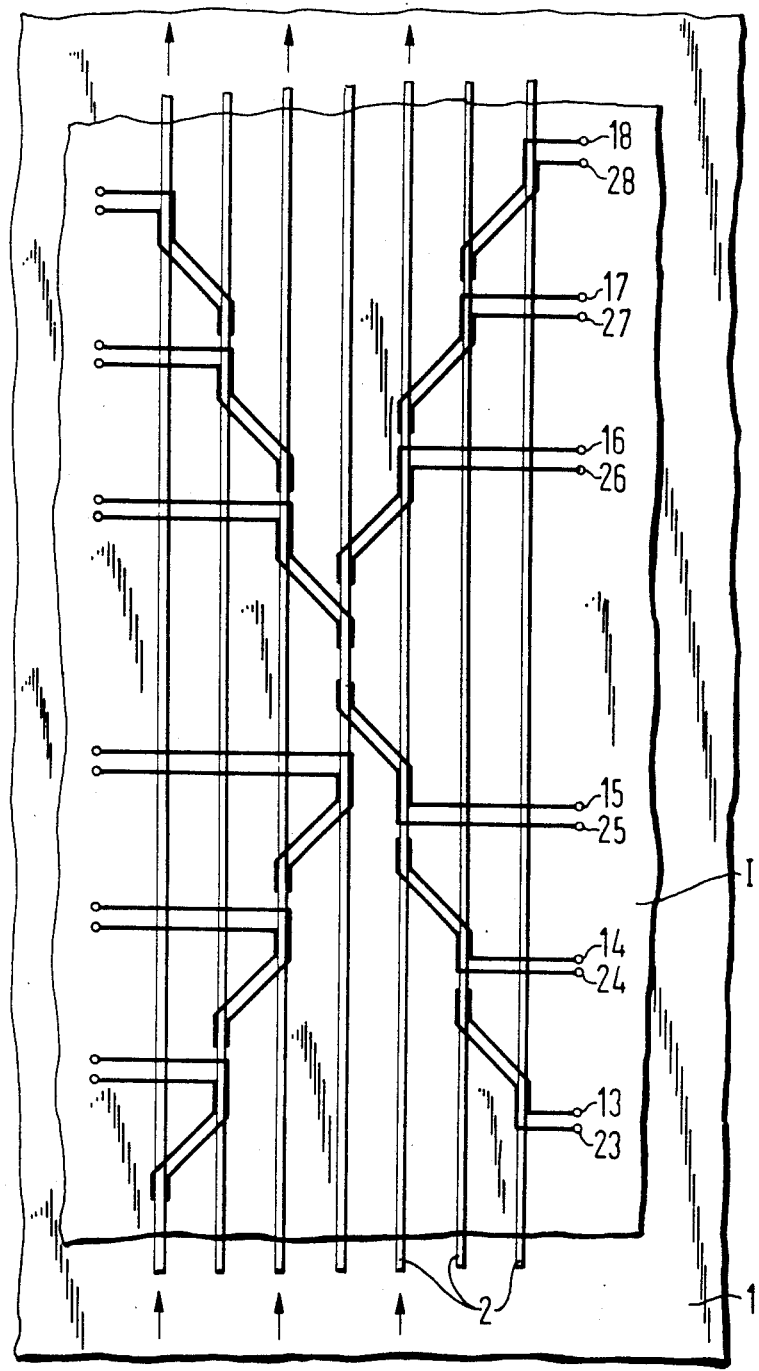
FIG. 1 shows a top view of the network in accordance with the invention.

In the optical waveguide network in accordance with the invention, shown diagrammatically in FIG. 1, 1 denotes a substrate on which a plurality of parallel waveguides 2 is disposed. In the embodiment example in FIG. 1, $n = 7$, i.e., there are 7 waveguides. The direction of the incoming guided signals is indicated by the arrows. The waveguides 2 can be applied to the substrate 1, for example, by electron beam evaporation of a suitable material with a specific refractive index in conjunction with a photographic technique known per se. In this case, the substrate 1 is a suitable electro-optical material. 13, 23 and 14, 24 and 15, 25, etc., denote pairs of electrodes so disposed in each case such that two electrode pairs, for instance 13, 23 and 18, 28, connect two adjacent waveguides in each case.

With the aid of the individually selectable electrode pairs, a waveguide 5 (FIGS. 3 and 4) is now induced in the substrate 1. Between the waveguides 2 and the substrate 1 there may be a thin dielectric intermediate layer 3. Above the waveguides 2 there is also a dielectric insulating dividing layer 4 which when of a suitable thickness, excludes light losses caused by the electrodes without thereby making construction of the induced waveguide 5 difficult through high voltage requirements.

Figure 2:
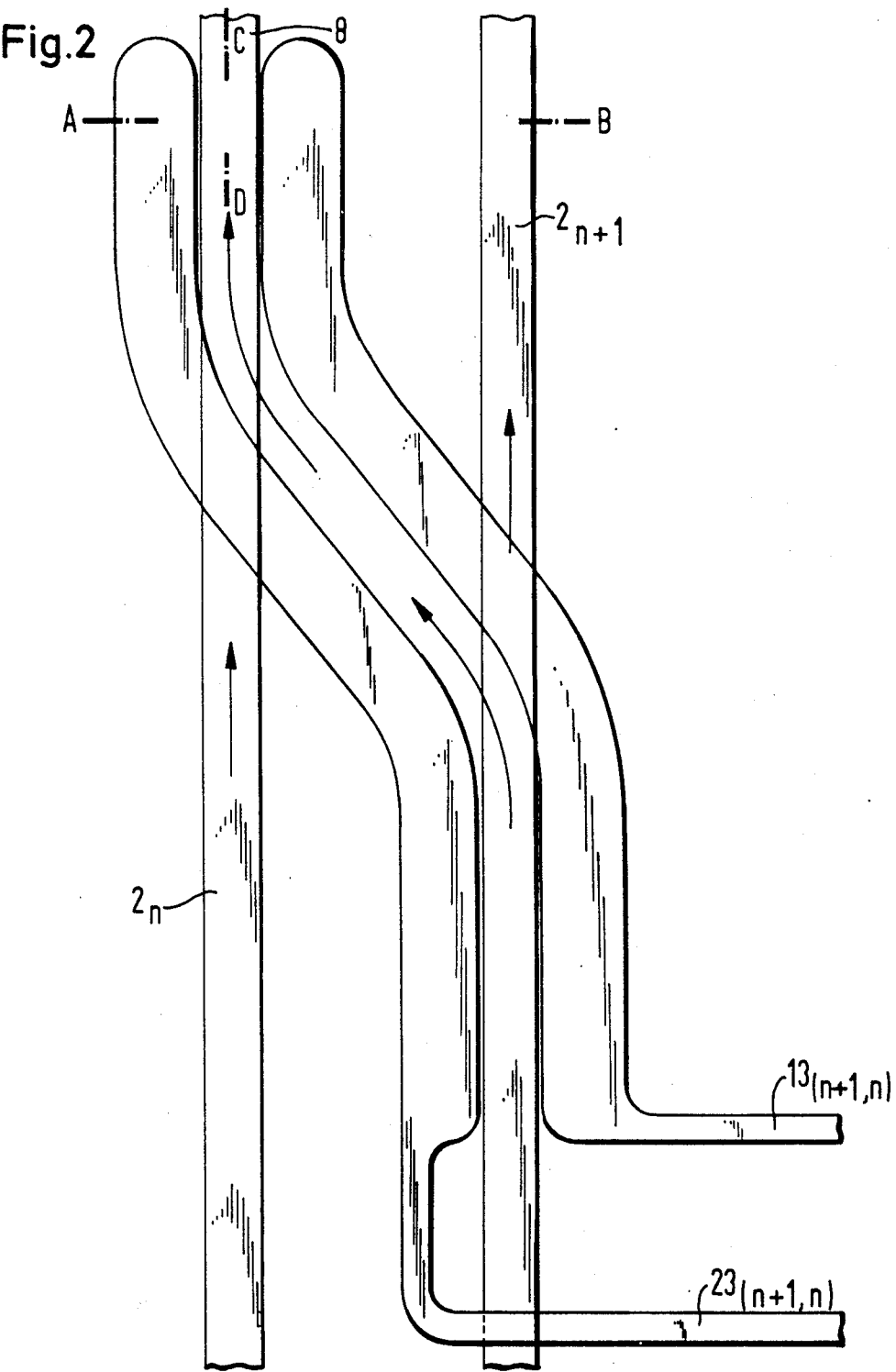
FIG. 2 shows the electrode arrangement at just one transfer point diagrammatically and out of scale.
Figure 3:
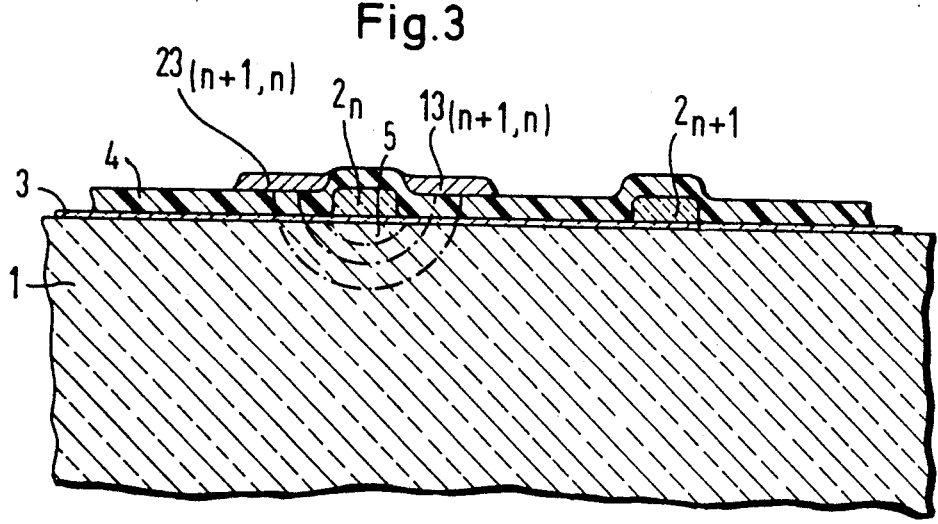
FIG. 3 shows a section along the line A—B in FIG. 2.
Figure 4:
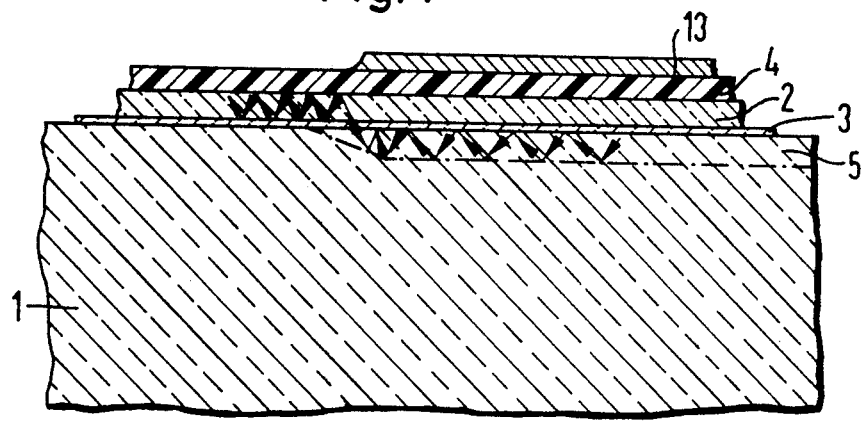
FIG. 4 shows a section along the line C—D in FIG. 2.

FIG. 2 in conjunction with the sectional views in FIGS. 3 and 4, shows the structure of a single switching element of the network in accordance with the invention using a lead zirconate and lead titanate ceramic material substrate. Without any field applied, the light is guided, for example, in the low-loss waveguide $2_{n+1}$ from the input $(n+1)$ to the output $(n+1)$. Here the following condition is satisfied for the refractive indices : $n_2 > n_1$, in which $n_2$ denotes the refractive index of the waveguide and $n_1$ the refractive index of the substrate. If a voltage is present at the electrode pair 13, 23, a waveguide is induced with $n_{Sind} = n_1 + \Delta n > n_2$ so that the guided light wave is transferred into the substrate 1 and there conveyed through the induced channel to $2_n$. This channel ends in the area of the stray field 8 of the electrode pair with a tapered configuration as in FIG. 4, so that again $n_1 < n_2$ is true and the light wave is led onwards in the low-loss waveguide $2_n$.

Figure 5:
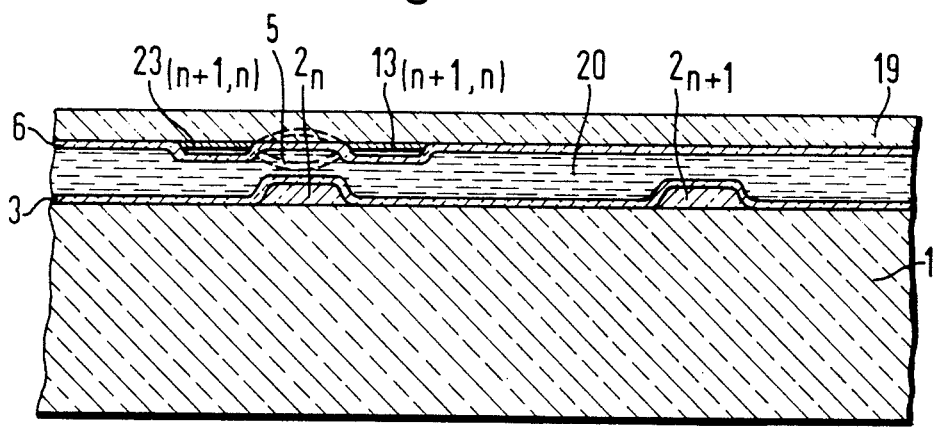
FIG. 5 shows an embodiment example with a liquid crystal layer.
Figure 6:
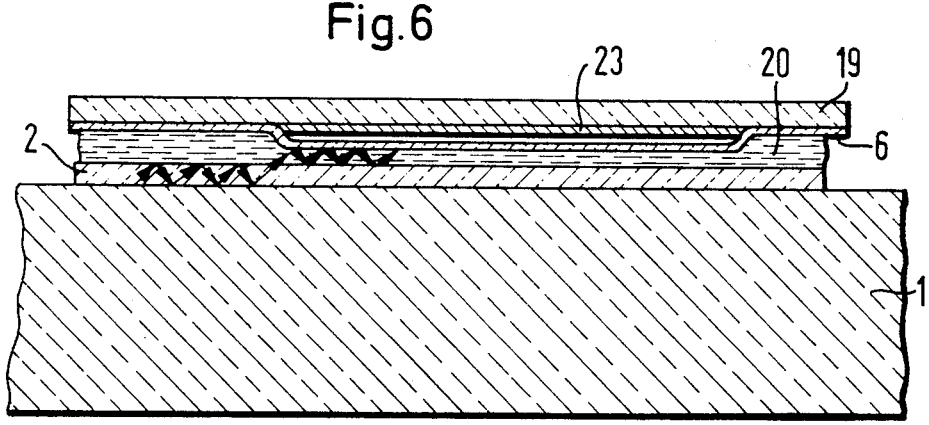
FIG. 6 shows a section through the embodiment example in FIG. 5.

The structure of a single switching element utilizing the properties of liquid crystals is shown in FIGS. 5 and 6. Waveguide strips are evaporated onto the substrate 1 and electrode strips 13, 23 are evaporated onto the covering sheet 19. The substrate with the strip conductors $2_n$, $2_{n+1}$ and the covering sheet with the electrode strips are then given thin intermediate layers 3, 6 of about 150 A by vapor deposition so that a linear structure is obtained on which the liquid crystal molecules of the liquid crystal layer 20 can align themselves. The substrate and the covering sheet are disposed a suitable distance apart by means of ties similarly vapor deposited but not shown in the figures.

When there is no voltage present at one of the electrode pairs 13,23, then because of the chosen molecule orientation, the refractive index of the liquid crystal is less than the refractive index of the waveguide crossovers from which the light cannot emerge therefore, so that the switch is closed. In the space between a pair of electrodes, a waveguide is induced by applying a voltage, the refractive index of the waveguide being higher than the refractive index of the waveguide crossovers. In this state, therefore, the switch is open because light, e.g., from the waveguide $2_{n+1}$ (FIG. 2), can be transferred to the waveguide $2_n$. The concept of the liquid crystal switch can be realized with the following material combination for example. Substrate and covering sheet in quartz glass with a refractive index $n = 1.457$.

Waveguides and intermediate layers in neodymium fluoride (NdF$_3$) with a refractive index $n = 1.601$ and a liquid crystal exhibiting a refractive index $n = 1.555$ in the closed state and a refractive index $n = 1.755$ in the open state.

By virtue of the sandwich structure in accordance with the invention of the effective zones, the separation tolerances can therefore be mastered more easily than with an arrangement with only one wave-guiding layer plane. The electro-optical waveguide sections subject to higher losses are very short in comparison to the waveguide paths of the entire integrated waveguide network.

It will be apparent to those skilled in the art that many modifications and variations may be effected without departing from the spirit and scope of the novel concepts of the present invention.

We claim as our invention:

1. An optical waveguide network including means for switching a guided signal from one to the other of two adjacent parallel disposed optical waveguides comprising:

a substrate of electro-optical material;

a plurality of parallel disposed optical waveguides formed on said substrate;

a plurality of electrode pairs including at least two for each optical waveguide being disposed above the plane of said waveguides for inducing in said substrate a waveguide between two adjacent channels when a voltage is applied to an electrode pair;

said electrode pairs when a voltage is applied thereto causing an induced optical waveguide to be induced in the substrate between said two adjacent waveguides and causing the relative refractive index of the substrate to change with respect to that of the optical waveguide so that it is greater than that of the optical waveguide, whereby the guided wave is transferred to the substrate and through the induced waveguide to the adjacent waveguide.

2. An optical waveguide network for crossing-free switching of a guided signal from any one input to any one output comprising a substrate, $n$ optical waveguides disposed parallel to one another on said substrate, a plurality of electrode pairs so arranged that there are for any two adjacent waveguides such waveguides are connected by two electrode pairs, the electrodes of said electrode pairs traversing the intervening space between the waveguides, the substrate being formed of an electro-optical material.

3. An optical waveguide network for crossing-free switching of a guided signal from any one input to any one output comprising a substrate, $n$ optical waveguides disposed parallel to one another on said substrate, a plurality of electrode pairs so arranged that there are for any two adjacent waveguides such waveguides are connected by two electrode pairs which cross the intervening space between said two adjacent waveguides, said substrate having a liquid crystal layer thereon which is outside of the waveguide plane.

4. An optical waveguide network for crossing-free switching of a guided signal from any one input to any one output comprising a substrate, $n$ optical waveguides disposed parallel to one another on said substrate, a plurality of electrode pairs so arranged that there are for any two adjacent waveguides such waveguides are connected by two electrode pairs which cross the intervening space between said two adjacent waveguides, said optical waveguides having a refractive index greater than that of the surrounding portion of said substrate, the area of said portion of said substrate between the said electrodes of an electrode pair having a refractive index greater than that of said optical waveguides when a voltage is applied to said electrodes of such a pair.

* * * * *